(12) United States Patent
Gupta et al.

(10) Patent No.: US 9,047,083 B2
(45) Date of Patent: Jun. 2, 2015

(54) REDUCING POWER CONSUMPTION IN A SERVER CLUSTER

(75) Inventors: Alok Kumar Gupta, Cupertino, CA (US); Minwen Ji, Los Altos, CA (US); Timothy P. Mann, Palo Alto, CA (US); Tahir Mobashir, Mountain View, CA (US); Umit Rencuzogullari, Sunnyvale, CA (US); Ganesha Shanmuganathan, Mountain View, CA (US); Limin Wang, Sunnyvale, CA (US); Anne Marie Holler, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 1572 days.

(21) Appl. No.: 12/557,284

(22) Filed: Sep. 10, 2009

(65) Prior Publication Data

US 2010/0070784 A1 Mar. 18, 2010

Related U.S. Application Data

(60) Provisional application No. 61/096,909, filed on Sep. 15, 2008.

(51) Int. Cl.
*G06F 1/32* (2006.01)
*G06F 9/50* (2006.01)

(52) U.S. Cl.
CPC ............ *G06F 1/3203* (2013.01); *G06F 1/3287* (2013.01); *G06F 9/5094* (2013.01); *Y02B 60/1278* (2013.01); *Y02B 60/1282* (2013.01); *Y02B 60/142* (2013.01); *Y02B 60/32* (2013.01)

(58) Field of Classification Search
USPC ......... 713/300, 320, 323, 324, 1, 2, 100, 310, 713/321, 322, 330, 340, 375
See application file for complete search history.

(56) References Cited

U.S. PATENT DOCUMENTS

| 7,434,104 B1* | 10/2008 | Skeoch et al. ............. 714/38.11 |
| 8,046,468 B2* | 10/2011 | Isci et al. ...................... 709/226 |
| 2005/0060590 A1* | 3/2005 | Bradley et al. ................ 713/320 |

OTHER PUBLICATIONS

Chase et al.; "Managing Energy and Server Resources in Hosting Centers"; Proc. ACM Symp. Operating System Principles (SOSP '01), 2001.

(Continued)

*Primary Examiner* — Kim Huynh
*Assistant Examiner* — Paul J Yen

(57) ABSTRACT

A method of reducing power consumption of a server cluster of host systems with virtual machines executing on the host systems is disclosed. The method includes recommending host system power-on when there is a host system whose utilization is above a target utilization, and recommending host system power-off when there is a host system whose utilization is below the target utilization. Recommending host system power-on includes calculating impact of powering on a standby host system with respect to reducing the number of highly-utilized host systems in the server cluster. The impact of powering on is calculated by simulating moving some virtual machines from highly utilized host systems to the standby host system being recommended to be powered on. Recommending host system power-off includes calculating impact of powering off a host system with respect to decreasing the number of less-utilized host systems in the server cluster. The impact of powering off is calculated by simulating moving all virtual machines from the host system, which is being recommended to be powered-off, to less -utilized host systems.

16 Claims, 2 Drawing Sheets

(56) References Cited

OTHER PUBLICATIONS

Rajamani et al; "On Evaluating Request-Distribution Schemes for Saving Energy in Server Clusters"; 2003.

Bradley, et al.; "Workload-based power management for parallel computer systems"; IBM J. Res. & Dev., vol. 47, No. 5/6, 2003, pp. 703-718.

Pinheiro et al.; "Dynamic cluster reconfiguration for power and performance"; 2003.

Chen et al.; "Managing Server Energy and Operational Costs in Hosting Centers"; SIGMETRICS '05, Jun. 6-10, 2005, Banff, Alberta, Canada.

Bertini et al.; "Statistical QoS Guarantee and Energy-efficiency in Web Server"; 2007.

* cited by examiner

REDUCING POWER CONSUMPTION IN A SERVER CLUSTER

CROSS REFERENCE TO RELATED APPLICATIONS

This application claims the benefit of U.S. Provisional Application No. 61/096,909, filed on Sep. 15, 2008.

TECHNICAL FIELD

One or more embodiments of the present invention relate generally to virtual machines executing on server clusters, and more particularly, to reducing power consumption in such server clusters.

BACKGROUND

Computer virtualization is a technique that involves encapsulating a physical computing machine platform into a virtual machine that is executed under the control of virtualization software on a hardware computing platform. Virtualization software enables multiple virtual machines to be run on a single hardware computing platform, and can manage the allocation of computing resources to each virtual machine in accordance with constraints and objectives.

A set of hardware computing platforms can be organized as a server cluster to provide computing resources for example, for a data center. In addition, supporting technology can move running virtual machines between servers in the cluster; an example of this supporting technology is sold as VMware VMotion™ by VMware, Inc. of Palo Alto, Calif. In addition, server cluster virtualization management software that incorporates cluster resource management technology can determine initial and ongoing locations of virtual machines on hardware computing platforms in the server cluster, and can manage the allocation of cluster computing resources in accordance with constraints and objectives. An example of this server cluster virtualization management software is sold as VMware Distributed Resource Scheduler™ by VMware, Inc. of Palo Alto, Calif. In addition, the server cluster virtualization management software can request that a server in the cluster power itself down, and can use mechanisms available in the marketplace to remotely power-on a server that is powered down. An example of this power management software is sold as the VMware Distributed Power Management feature within the VMware Distributed Resource Scheduler by VMware, Inc. of Palo Alto, Calif.

Server clusters consume significant power. The cost of that power is a major expense in operating a server cluster, and generating that power can have an environmental impact.

SUMMARY

In one embodiment, a method of reducing power consumption of a server cluster of host systems with virtual machines executing on the host systems is disclosed. The method includes recommending host system power-on when there is a host system whose utilization is above a target utilization, and recommending host system power-off when there is a host system whose utilization is below the target utilization. Recommending host system power-on includes calculating impact of powering on a standby host system with respect to reducing the number of highly-utilized host systems in the server cluster. The impact of powering on is calculated by simulating moving some virtual machines from highly utilized host systems to the standby host system being recommended to be powered on. Recommending host system power-off includes calculating impact of powering off a host system with respect to decreasing the number of less-utilized host systems in the server cluster. The impact of powering off is calculated by simulating moving some or all virtual machines from the host system, which is being recommended to be powered-off, to less-utilized host systems. In the preferred embodiment, all running virtual machines are moved of a host before powering the host off (or simulating powering the host off). In another embodiment, one or more selected classes of VMs that are designated as being OK to leave on the host and power off along with the host, are not moved or factored in the power off simulation calculations. Therefore, in one embodiment, the term "moving all VMs" means either moving all running VMs or moving all running VMs but one or more selected classes of VMs that are designated as being OK to leave on the host during the host power off.

In another embodiment, a system for reducing power consumption of a server cluster of host systems with virtual machines executing on the host systems is disclosed. The system includes a cluster management server to manage the server cluster, the cluster management server including a distributed resource scheduling (DRS) module to manage allocation of resources to the virtual machines running on the server cluster and a distributed power management (DPM) module coupled to the DRS module to recommend powering-on of powering-off a host system in the server cluster to save power.

In yet another embodiment, a computer readable media having program instructions for reducing power consumption of a server cluster of host systems with virtual machines executing on the host systems is disclosed. The computer readable media includes program instructions for recommending host system power-on when there is a host system whose utilization is above a target utilization, and recommending host system power-off when there is a host system whose utilization is below the target utilization. Program instructions for recommending host system power-on includes program instructions for calculating impact of powering on a standby host system with respect to reducing the number of highly-utilized host systems in the server cluster, the impact of powering on is calculated by simulating moving some virtual machines from highly utilized host systems to the standby host system being recommended to be powered on. Program instructions for recommending host system power-off includes program instructions for calculating impact of powering off a host system with respect to decreasing the number of less-utilized host systems in the server cluster, the impact of powering off is calculated by simulating moving some or all virtual machines from the host system, which is being recommended to be powered-off, to less-utilized host systems.

DETAILED DESCRIPTION

One or more embodiments of the present invention are a method, machine-readable medium, and a system for reducing power consumption of a server cluster. In particular, one embodiment is a method of reducing power consumption of a server cluster of host systems with virtual machines executing on the host systems, the method comprising: considering recommending host system power-on when there is a host system whose utilization is above a target utilization range, and considering recommending host system power-off when there is a host system whose utilization is below the target utilization range; wherein considering recommending host system power-on comprises iterating as follows: for each host system, determining utilization as the ratio of demand to capacity for the host system, and if the utilization for any host system is over a target utilization, iterating through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host powered on, recommending that the standby host system be powered on; and wherein considering recommending host system power-off comprises iterating as follows: for each host system, determining utilization, and if the utilization for any host system is under a target utilization, iterating through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that with the host system kept powered on, recommending that the host system be powered off.

Figure 1:
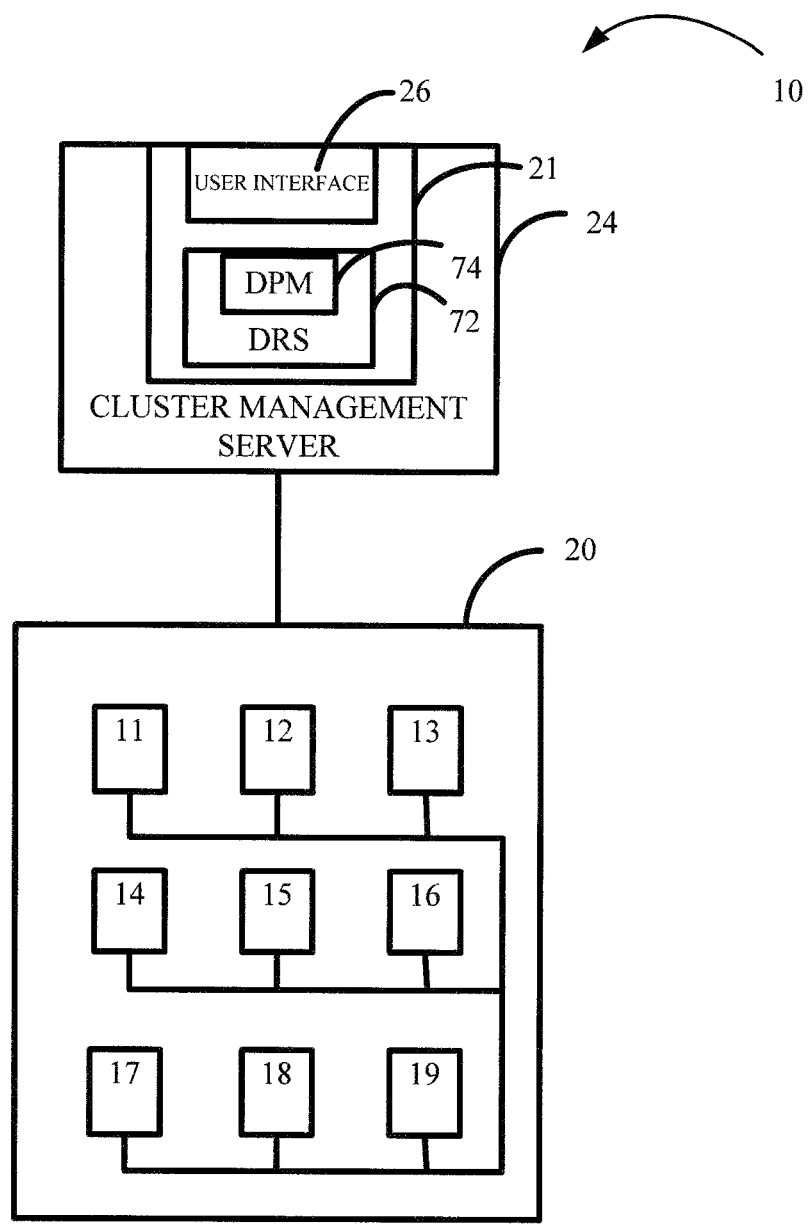
FIG. 1 is a pictorial representation of a computer system that includes a server cluster in accordance with one or more embodiments of the present invention.

FIG. 1 is a pictorial representation of computer system 10 that includes server cluster 20 in accordance with one or more embodiments of the present invention. As shown in FIG. 1, server cluster 20 includes a plurality of hardware computing platforms 11-19 (also referred to herein as host systems 11-19) that are grouped or clustered together (physically or logically). Although only nine host systems 11-19 are shown in FIG. 1, in practice, server cluster 20 may include an arbitrary number of host systems. As further shown in FIG. 1, server cluster virtualization management software 21 runs on cluster management server 24. Server cluster virtualization management software 21 includes user interface 26 and is in data communication with each of host systems 11-19. User interface 26 facilitates data communication with server cluster virtualization management software 21 to enable a user to control operations of server cluster 20, as is discussed more fully below.

Figure 2:
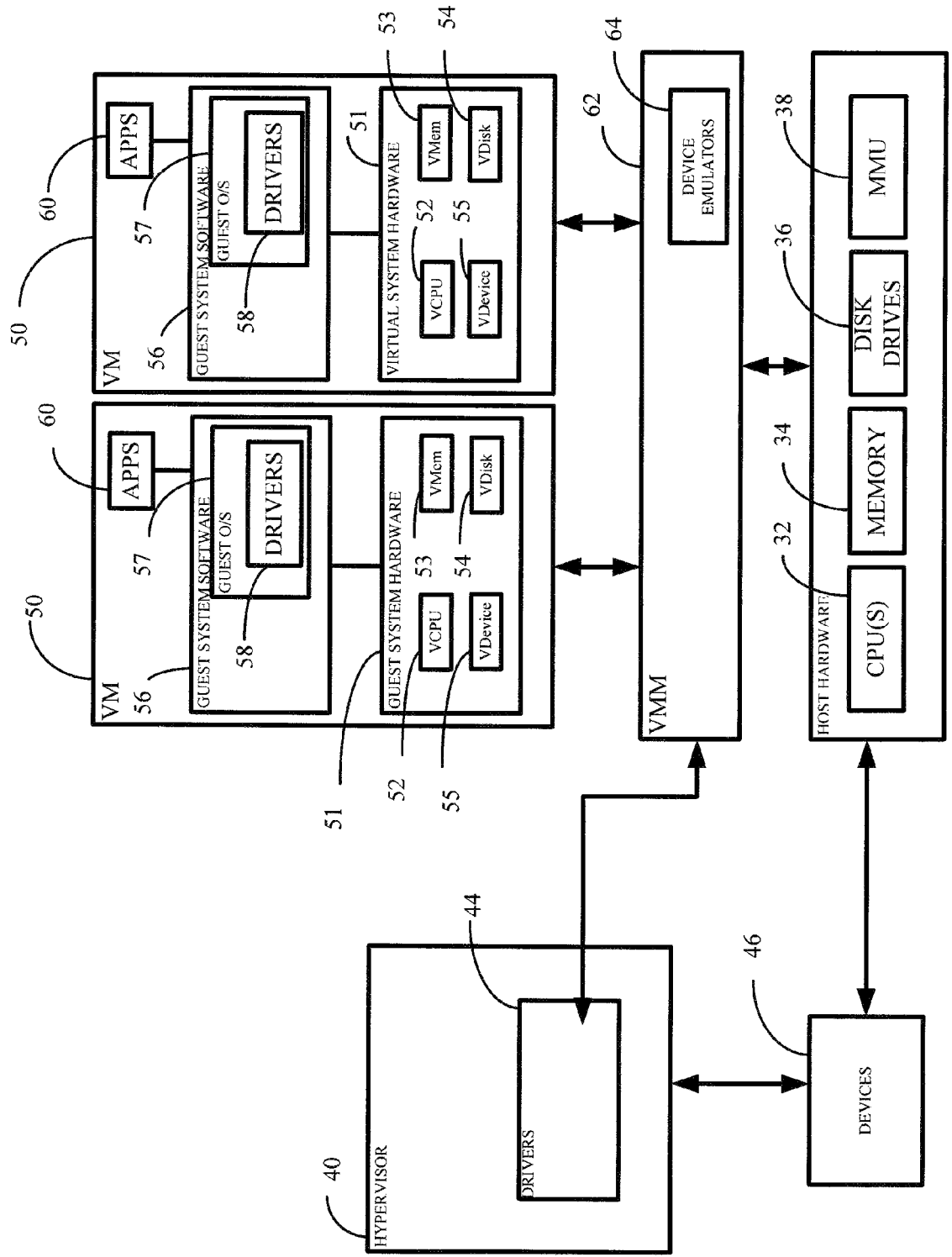
FIG. 2 is a block diagram representing an example of a host system included in the server cluster shown in FIG. 1.

FIG. 2 is a block diagram representing an example of a host system included in server cluster shown in FIG. 1. Referring to FIG. 2, each of host systems 11-19 includes physical hardware and virtualization software. The physical hardware, referred to here as host hardware, is standard to computer systems, and may include one or more CPU(s) 32, physical memory 34, disk drives 36, memory management unit (MMU) 38, as well as conventional registers (not shown), interrupt-handling circuitry (not shown), a clock (not shown), etc. Running on the physical hardware is hypervisor software 40, including software drivers 44 which facilitate communication with various physical input/output devices 46.

As further shown in FIG. 2, virtual machines (VMs) 50 running on the host hardware of host systems 11-19. In operation, any number of VMs 50 may be present. As is well known, each VM 50 is provided with an interface representing a complete physical computer system, which interface is implemented using host hardware and virtualization software. In particular, each VM 50 is presented with guest system hardware 51 that may have one or a plurality of virtual CPUs 52 (VCPU 52), virtual system memory 53 (VMem 53), virtual disks 54 (VDisk 54), and other virtual devices 55 (VDevice 55). In addition, each VM 50 includes guest system software 56 that may include guest operating system 57 (guest OS 57) which may, but need not, be a copy of a conventional, commodity OS, as well as drivers 58 that, for example, control VDevice(s) 55. Each VM 50 may have one or more applications 60 installed to run on guest OS 57; any number of applications, including none at all, may be loaded for running on guest OS 57, the number being limited only by the requirements of each VM 50.

Virtual machine monitor (VMM) 62 is an interface between each VM 50 and the host hardware that is responsible for allowing execution of, or for executing, VM-related instructions, and for mapping guest memory to host memory 34. VMM 62 is a layer of software that runs directly on the host hardware in privileged mode. VMM 62 may include device emulators 64, which may form an implementation of guest system hardware 51. VMM 62 handles faults and interrupts engendered by or delivered for each VM 50. For simplicity of illustration, VM 50 and VMM 62 are shown as separate software; however, the combination of VM 50 and VMM 62 may be viewed as comprising a running virtual machine instance. VMM 62 may forward to hypervisor system software 40 requests by a VM 50 for machine resources. Also, VMM 62 may request hypervisor system software 40 to perform I/O by calling software drivers 44.

Referring again to FIGS. 1 and 2, one function of server cluster virtualization management software 24 is to facilitate transfer of VMs 50 among host systems 11-19 in an automated fashion. As shown in FIG. 1, server cluster virtualization management software 24 includes Distributed Resource Scheduler (DRS) module 72 and Distributed Power Management (DPM) module 74. Transfer of VMs 50 among host systems 11-19 is also referred to as VM migration. All VMs 50 being migrated from one of host systems 11-19 is referred to as evacuation of the host system. DRS module 72 manages computational resources of server cluster 20 and their allocation to each VM 50 executing on host systems 11-19. Specifically, each host system 11-19 has computational resources associated therewith that are measured, for example and without limitation, in terms of CPU cycles and memory bytes capacity available. In addition, the VMs 50 on each host system 11-19 have defined resource requirements, and place variable resource demands on the computational resources associated with host systems 11-19. DRS module 72 may: (a) power-on additional host systems 11-19, if available and if needed to support the resource constraints of VMs 50; and (b) perform a load balancing function involving migrating VMs 50 among powered-on host systems 11-19 of server cluster 20. To address the resource constraints of the VMs 50, DRS module 72 ascertains whether the powered-on capacity of server cluster 20 is sufficient to satisfy the resource constraints of all VMs 50. If the resource constraints cannot be satisfied by the powered-on host systems, DRS module 72 may identify, in server cluster 20, host systems 11-19 that are in a powered-down state and which could address violations of resource constraints. For such host systems, DRS module 72 signals through a data communication channel (not shown) to those host systems to power-on, and DRS module 72 requests subsequent transfer of VMs 50 to the newly powered-on ones of host systems 11-19, thereby revising a current on/off configuration (COC) of server cluster 20 to a new on/off configuration (NOC). After addressing any resource constraint violations, DRS module 72 further considers moving VMs 50 among host systems with an objective of better load balance among host systems to improve delivery of resources. An example of a suitable DRS module 72 is available as VMware Distributed Resource Scheduler from VMware, Inc. of Palo Alto, Calif. which manages the allocation of resources to a set of VMs running on a cluster of host systems, given resource-based Service Level Agreements and system- and user-specified constraints. Server cluster virtualization management software 24 may also include "high availability" software (HA) that handles host system and VM failures in a server cluster given a specification of desired policies and of associated resources to be set aside for use by VMs in the event of a failure. As such, HA implements mechanisms for detecting problems and restarting VMs. An example of suitable HA software is available as VMware High Availability from VMware, Inc. of Palo Alto, Calif.

To reduce power consumption of server cluster 20, DRS module 72 includes Distributed Power Management (DPM) module 74 that is invoked after DRS module 72 addresses the constraints and objectives described above. DPM module 74 functions to regulate the on/off configuration of server cluster 20 so that a desired level of computational performance with reduced power consumption may be established and/or maintained. This is achieved by DPM module 74 computing the utilization of each host system 11-19 in server cluster 20 to derive information about any of host systems 11-19 that are highly-utilized and any that are lightly-utilized by VMs 50 executing thereon. In general, DPM module 74 saves power in a cluster of server hosts by consolidating virtual machines onto fewer hosts and powering hosts off during periods of low resource utilization, and powering hosts back on for virtual machine use when workload demands increase. In particular, DPM module 74 saves power in a cluster by recommending evacuation and power-off of hosts when both CPU and memory resources are lightly utilized. DPM module 74 recommends powering hosts back on when either CPU or memory resource utilization increases appropriately or host resources are needed to meet other user-specified constraints. DPM module 74 leverages the capability of executing DRS module 72 in a "what-if" mode to ensure its host power recommendations are consistent with cluster constraints and objectives being managed by DRS module 72. The reason that DPM module 74 chooses to evacuate host systems and power them down is that host systems typically burn 60% or more of their peak power when totally idle, so the power savings possible with this approach are substantial. Once DPM module 74 has determined how many host systems need to remain powered on to handle the load and to satisfy all relevant constraints, and DRS module 72 has distributed VMs across the host systems in keeping with resource allocation constraints and objectives, each individual host system is free to power-manage its hardware to run the presented load efficiently, without any need for DPM module 74 involvement. Thus, DPM module 74 can save power in server cluster 20 when there are periods of low utilization of cluster resources, and DPM module 74 operates in concert with DRS module 72 constraints and HA constraints, if any, saving power while ensuring the availability of powered-on resources to satisfy, for example, Service Level Agreements.

In accordance with one or more embodiments of the present invention, DPM module 74 can be enabled or disabled at the cluster level. When enabled for a server cluster, DPM module 74 can operate in manual mode, in which execution of DPM module 74 recommendations requires confirmation by a user, or in automatic mode, in which DPM module 74 recommendations are executed without user confirmation. In addition, DPM can be set as disabled, manual, or automatic on a per-host basis; per-host settings apply only when DPM module 74 is enabled for the cluster. Various default settings of DPM are intended to support performance and power-efficient use of cluster resources, and may be changed by the user.

DPM module 74 Operation: As set forth above, the goal of DPM module 74 is to keep utilization of host systems in a server cluster within a target range, subject to constraints specified by DPM operating parameters and those associated with DRS, and, optionally, HA. To do this, DPM module 74 considers recommending host system power-on operations when there are host systems whose utilization is above this range and host system power-off operations when there are host systems whose utilization is below it. In accordance with one or more embodiments of the present invention, DPM module 74 is run as part of a periodic (for example and without limitation, every 5 minutes by default) invocation of DRS module 72, immediately after DRS module 72 cluster analysis and rebalancing completes. DRS module 72 itself may recommend host power-on operations, if needed, as a prerequisite for migration recommendations to address HA or DRS constraint violations, to handle user requests involving host evacuation, or to place VMs on hosts for power-on.

DPM module 74 method for evaluating host utilization: DPM module 74 evaluates the CPU and memory resource utilization of each host system and aims to keep each host system's resource utilization within a range DemandCapacityRatioTarget±DemandCapacityRatio ToleranceHost; where configurable parameter DemandCapacityRatioTarget is a DPM module 74 per-host utilization target, for example and without limitation, a default is 63%, and configurable parameter DemandCapacityRatioToleranceHost is a DPM module 74 per-host tolerance around its target utilization, for example and without limitation, a default is 18, meaning a default utilization range is 63+/−18=45% to 81%. Each host system's resource utilization is calculated as demand/capacity, where demand is the total amount of CPU or memory resource needed by VMs currently running on the host system, and capacity is the total amount of CPU or memory resource currently available on the host system for use by running VMs. A VM's demand includes both its actual usage and an estimate of its unsatisfied demand. This compensates for cases in which a demand value is constrained by host system resources currently available to the VM. Note that if a host system resource is heavily contended, its utilization can exceed 100%.

DPM module 74 calculates each host system's demand as a sum, across the host system's running VMs, of each VM's average demand over an historical period of interest plus a configurable number of standard deviations (with the sum capped at the VM's maximum demand observed over the period). The configurable number VmDemandHistoryNumStdDevAboveAve of standard deviations above the average demand over the period in question that DPM module 74 uses in considering demand in its utilization computation could have, for example and without limitation, a default of 2. Using a VM's average demand over a period of interest, rather than simply its current demand, is intended to ensure that the demand used is not anomalous. The period of interest DPM module 74 considers with respect to: (a) evaluating demand that may lead to host power-on is the last VmDemandHistorySecsHostOn seconds; where configurable parameter VmDemandHistorySecsHostOn is the period of demand history DPM module 74 uses with respect to considering host power-on to address high utilization, for example, a default is 300 seconds or 5 minutes); and (b) evaluating demand that may lead to host power-off is the last VmDemandHistorySecsHostOff seconds; where configurable parameter VmDemandHistorySecsHostOff is the period of demand history DPM module 74 uses with respect to considering host power-off to address low utilization, for example and without limitation, a default is 2400 seconds or 40 minutes. In accordance with one or more embodiments of the present invention, the shorter default history period considered for host power-on is chosen so that DPM module 74 responds relatively rapidly to increases in composite VM demand, while the longer default history period considered for host power-off is chosen so that DPM module 74 responds relatively slowly to decreases in composite VM demand. Computing VM demand using a configurable number of standard deviations above its average demand is intended to provide significant coverage of the probable range of the demand, based on observed past demand during the period of interest.

If any host system's CPU or memory resource utilization over the period considered with respect to host power-on is above the target utilization range, DPM module 74 considers powering host systems on. If any host system's CPU and any host system's memory resource utilization over the period considered with respect to host power-off is below the target utilization range, DPM module 74 considers powering host systems off, when host systems are not already being recommended for power-on.

DPM module 74 method for ensuring host capacity is powered-on when needed to address VM demand: If the host resource utilization evaluation described above leads DPM module 74 to consider recommending host power-on operations to address high utilization, DPM module 74 iterates through standby host systems, i.e., host systems powered off, in a sorted order (described below). For each standby host system, DPM module 74 invokes DRS module 72 in a "what-if" mode to rebalance the VMs across host systems in the cluster system, assuming that host system were powered-on. To quantify the impact of powering on a standby host system with respect to reducing the number of highly-utilized host systems in the server cluster and/or to diminishing their distance above the target utilization, DPM module 74 computes for each resource a score denoted highScore as a sum of the weighted distance above the target utilization for each host system above that target. DPM module 74 compares the value of highScore for the server cluster without the host system powered-on with that calculated for the system cluster via DRS module 72 "what-if" mode run with the host system powered-on. If the associated value of highScore is stably improved for the server cluster with the standby host system powered-on, DPM module 74 generates a power-on recommendation for the host system. Note that in accordance with one or more embodiments of the present invention, in comparing highScore values, if the memory resource is overcommitted on host systems in the server cluster, DPM module 74 will give reduction in memory utilization higher importance than it gives impact on CPU resources. DPM module 74 continues to iterate through the standby host systems for power-on consideration, as long as there are any host systems in the server cluster exceeding the target utilization range for either CPU or memory resources. In accordance with one or more such embodiments, DPM module 74 will skip with respect to power-on consideration any standby host systems that are equivalent (in terms of VMotion compatibility and of having the same or fewer CPU and memory resources) to any host systems already rejected for power-on based on the DRS module 72 "what-if" evaluation during this round of iterative consideration.

DPM module 74 then recommends powering on any additional host systems needed to reach a minimum amount of powered-on CPU or memory resources. For example, this may be the maximum of any values specified by HA, optionally set by the user, or defined by default. In accordance with one or more embodiments of the present invention, specifying a minimum amount of powered-on capacity is not required since DRS module 72/DPM module 74 will recommend that appropriate host systems be powered-on when needed and will keep host systems powered-on to respect any HA failover settings. Further, in accordance with one or more further embodiments of the present invention, one can specify that a particular minimum amount of CPU and/or memory capacity be kept powered-on, even when that capacity is not deemed necessary by DRS module 72/DPM module 74. Note that the host capacity kept powered-on to satisfy these settings is not necessarily compatible with the future needs of some arbitrary VM (for example, it may not match the required CPU characteristics), so these settings are most useful in server clusters of similar host systems that are compatible with the majority of VMs. Configurable parameter MinPoweredOnCpuCapacity is the minimum amount of powered-on CPU capacity in MHz to be maintained by DPM module 74, for example and without limitation, a default is 1 MHz; and configurable parameter MinPoweredOnMemCapacity is the minimum amount of powered-on memory capacity to be maintained by DPM module 74, for example and without limitation, 1 MB. Note that at least one host system in the server cluster is kept powered-on, and that host systems powered-on solely to reach a specified minimum amount of CPU or memory resources are not needed to accommodate VMs currently running in the server cluster, and may be idle.

DPM method for determining when host capacity is excess and can be powered-down: If the host resource utilization evaluation described above leads DPM module 74 to consider recommending host system power-off to address low utilization, DPM module 74 iterates through the powered-on host systems in the sorted order described below. For each powered-on host system, DPM module 74 invokes DRS module 72 in a "what-if" mode to rebalance the VMs across the host systems in the server cluster, assuming that the host system were powered-off. To quantify the impact of powering off a host system with respect to reducing the number of lightly-utilized host systems in the server cluster and/or to diminishing their distance below the target utilization, DPM module 74 computes for each resource a score denoted lowScore as a sum of the weighted distance below target utilization of all host systems below that target. DPM module 74 compares the value of lowScore for the server cluster without the host system powered-off with that calculated on the server cluster via the DRS module 72 "what-if" mode run with the host system powered-off. If the associated value of lowScore is improved with the host system powered-off and if the value of highScore described above for the resulting server cluster is not worse than that with the host system kept powered-on, DPM module 74 generates a recommendation to power-off the host module 74, along with recommendations for any needed prerequisite migrations of VMs off of that host system. DPM module 74 continues to iterate through the powered-on host systems for power-off consideration, as long as the server cluster contains any host systems below the target utilization range for CPU resources and any host systems below the target utilization range for memory resources.

In accordance with one or more embodiments of the present invention, several additional factors are also considered with respect to placing a host system in standby. One factor is that DPM module 74 will not recommend any host system power-off operations (and hence DPM module 74 is effectively disabled) if a DRS module 72 migration is set so it will not produce any non-mandatory recommendations to move VMs to those host systems. A second factor is that DPM module 74 rejects powering down a host system if its entering standby would take the powered-on capacity of the server cluster below the specified minimum (described above). And a third factor is that DPM module 74 chooses not to power down a host system if the conservatively-projected benefit of placing that host system into standby does not exceed by a specified multiplier the potential risk-adjusted cost of doing so, as described in cost/benefit analysis below.

Host System Power-off Cost/Benefit Analysis: Host system power-off has a number of potential associated costs, including the cost of migrating any running VMs off of the associated host system, the loss of the host system's resources during power-down, power consumed during the power-down period, the loss of performance if the host system's resources become needed to meet demand while the host system is powered off, the loss of the host system's resources during its subsequent power-on operation, the power consumed during the power-up period, and the costs of migrating VMs back onto the host system. For each host system considered for power-off, DPM module 74 compares these costs (taking into account an estimate of their associated risks) with a conservative projection of the power-savings benefit that will be obtained by powering off the host system in an analysis step called DPM power-off cost/benefit.

DPM module 74 power-off cost/benefit calculates StableOffTime, which is the time a host system is powered-off and unlikely to be needed; the power saved during this time represents a risk-adjusted conservative benefit of powering the host system down. The time it takes to power off a host system is computed as a sum of the time to evacuate VMs currently running on that host system (HostEvacuationTime) and the subsequent time to perform an orderly shutdown of the host system (HostPowerOffTime). The time at which a host system becomes likely to be needed is denoted as ClusterStableTime and is conservatively computed as a configurable percentile value of the running VMs' demand stable times, based on the coefficient of variance of the demand of each. DPM-module 74 power-off cost/benefit sorts the running VMs' demand stable times (based on the coefficient of variance of the demand of each) in ascending order. The configurable parameter PowerPerformancePercentileMultiplier is the percentile point within this list that is selected as an estimate of the time at which all VMs in the server cluster are projected to jump to a high demand level suggested by their history and it has, for example and without limitation, a default of 10. Hence, StableOffTime is computed as ClusterStableTime−(HostEvacuationTime+HostPowerOffTime). At the end of ClusterStableTime, the demand for each VM is conservatively assumed to rise to a high level, which is computed as the mean of its demand over the PowerPerformanceHistorySecs seconds (a configurable parameter representing the period of demand history considered by DPM module 74 power-off cost/benefit, for example and without limitation, a default is 3600 seconds) plus PowerPerformanceVmDemandHistoryNumStdDev standard deviations (a configurable parameter representing the number of standard deviations above the average demand over the period in question that DPM module 74 power-off cost/benefit uses in computing its conservative high demand point, for example and without limitation, a default is 3). DPM module 74 rejects a host system for power-off if StableOffTime is computed as less than or equal to 0.

With respect to host systems for which this StableOffTime benefit period is greater than 0, DPM module 74 compares the host module 74 power-off benefit to its cost, both expressed in terms of resources as the common unit. Power-off benefit is computed as the resource capacity saved (i.e., powered-off) during StableOffTime. Power-off cost is calculated as the resource costs of migrating VMs off of this host system prior to power-off, the expected resource costs of migrating VMs back onto this host system when the conservatively-projected high demand occurs, and any associated performance impact in terms of unsatisfied resource demand for the period during which a needed host system is being brought out of standby. DPM module 74 cost/benefit rejects a potential host system power-off recommendation unless the benefit is greater than or equal to the cost multiplied by PowerPerformanceRatio for all resources (PowerPerformanceRatio is a configurable parameter that represents the multiplier by which benefit must meet or exceed performance impact, for example and without limitation, a default of 40).

Sort Order in which DPM module 74 considers host systems for potential power-on or power-off: With respect to both power-on and power-off operations, host systems in DPM module 74 automatic mode are considered before host systems in DPM module 74 manual mode. Host systems at the same DPM module 74 automation level are considered in order of capacity with respect to the more critical resource (CPU or memory) and then with respect to the other resource; hence, larger capacity host systems are favored for power-on and smaller for power-off. Host systems at the same automation level and capacity are considered for power-off in order of lower VM evacuation cost. For ties with respect to the previous factors, host systems are considered for power-off in randomized order, to spread the selection across host systems for a wear-leveling effect. Other factors may be considered in determining host system ordering for power-on or power-off consideration such as, for example and without limitation, host system power efficiency.

Note that the order in which host systems are considered by DPM module 74 does not determine the actual order in which host systems are selected for power-on or power-off. As explained previously, DPM module 74 invokes DRS module 72 in a "what-if" mode for each candidate host system, and there are a number of reasons why a candidate host system may be rejected, based on DRS module 72 operating constraints and objectives. For host power-off, some example situations limiting host selection include constraints leading to an inability to evacuate all VMs from a candidate host or cases in which VMs to be evacuated are only moveable to host systems that will then become (more) heavily utilized. For host power-on, some example situations limiting host selection include constraints such that no VMs would move to a host if it were powered-on or such that the VMs that would move to a candidate host are not expected to reduce load on the highly-utilized hosts in the cluster. In addition, DPM module 74 will not strictly adhere to its host sort order if doing so would lead to choosing a host with excessively larger capacity than needed, if a smaller capacity host that can adequately handle the demand is also available.

DPM module 74 host system power recommendations are assigned ratings, signifying their expected importance given the current utilization of host systems in the server cluster, and any constraints on powered-on capacity. Host system power-on recommendations are rated, for example, as 3 to 5. Power-on recommendations generated to meet any HA or optional user-specified powered-on capacity requirements receive a rating of 5. Power-on recommendations produced to address high host utilization are rated as 3 or 4, with the higher number meaning that host system utilization is closer to saturation. Host power-off recommendations are rated as 1 to 4. A higher rating for power-off signifies a larger amount of unused but powered-on capacity in the cluster, and hence a more attractive opportunity for power savings given the powered-on resource headroom. These ratings could also be expressed as priorities, e.g., with a priority of 1 being equivalent to a rating of 5.

DPM module 74 recommendation ratings are compared to a configured DPM module 74 recommendation threshold (for example, from 1 to 5) where DPM module 74 discards recommendations below the threshold. For example, a DPM recommendation threshold of is 1 means all DPM module 74 recommendations meet the threshold.

In light of the above, one can readily appreciate that, in accordance with one or more embodiments of the present invention, DPM module 74 periodically compares demand for computational resources with available computational capacity of powered-on host systems. If the demand to capacity ratio is too high (for example, compared to a predetermined or user set parameter) on any host system in server cluster 20, DPM module 74 asks DRS module 72 to produce a "what-if" plan for server cluster 20, assuming a particular powered-down host system were available and powered-on. If that plan reduces high host utilization, DPM module 74 accepts the "what if" plan, and continues. DPM module 74 iterates in this fashion, as long as it detects high utilization on any host system in a configuration of server cluster 20 that includes ones to be powered-on from previous steps. After that, DPM module 74 determines if the demand to capacity ratio is too low (for example, compared to a predetermined or user set parameter) on any host system in server cluster 20, DPM module 74 asks DRS module 72 to produce a "what-if" plan for evacuating VMs from a specified powered-on host system and utilizing the remaining host systems more fully, in accordance with all relevant resource allocation, performance, and high availability attributes. If such a plan can be produced that ameliorates low host utilization without resulting in high host utilization and meets cost/benefit criteria concerning performance impact risk versus power savings, DPM module 74 accepts the "what if" plan, and continues. DPM module 74 iterates in this fashion through available powered-on host systems, as long as it detects low utilization on any host system in server cluster 20. Note that, in accordance with one or more embodiments of the present invention, considering demand to capacity ratio on a per host system basis allows handling a case in which host systems in server cluster 20 are not homogeneous in size or configuration, meaning that some host systems may be highly utilized, even when server cluster 20 is not so in an overall sense. Also note that a calculation of demand for purposes of determining utilization can be based on current, historical, and predicted data, in accordance with parameters that may be modified by the user.

In accordance with one or more embodiments of the present invention, DRS module 72 is run at a periodic time interval, for example, every five minutes, which is consistent with an ability to meet cluster management objectives relating, for example and without limitation, to allocation of cluster computing resources. The time interval may be set by a user as desired, and/or DRS module 72 may be invoked aperiodically, in reaction to user input or in reaction a cluster related change such as, if a host system fails.

The following is pseudo-code for a method of considering host system power-on and power-off operations in server cluster 20 in accordance with one or more embodiments of the present invention. In the pseudo-code, targetUtilization is demand/capacity desired. For example, this is a user defined parameter. In particular, in accordance with one or more embodiments of the present invention, targetUtilization is, for example and without limitation, 63%. In the pseudo-code, tolerance is a range of values around targetUtilization. For example, this a user defined parameter. In particular, in accordance with one or more embodiments of the present invention, tolerance is, for example and without limitation, ±18%. The steps of the pseudo-code are as follows:

100. For the current on/off configuration (COC), DRS module 72 runs to address constraints and perform load-balancing, with powering-on of host systems allowed.
101. DRS module 72 calls DPM module 74, whose operation is parameterized by targetUtilization and tolerance.
102. For the COC, for each powered-on host system, for each computational resource, DPM module 74 calculates hostUtilization where hostUtilization=demand/capacity and demand=each running VM's desired resources (actual usage+estimate of unsatisfied demand) and capacity=host system resources for use by VMs.
103. For COC, DPM module 74 calculates the following across each powered-on host system and for each computational resource:
   for host systems with hostUtilization>targetUtilization for the resource:
   highScore[computational resource]=SQRT(SUM(SQR(hostUtilization−targetUtilization)));
   highUtil[computational resource]=(any host system hostUtilization>(targetUtilization+tolerance))? true: false;
   considerHostPowerOn=(highUtil[computation resource] for either resource)? true:false;
   for host systems with hostUtilization<targetUtilization for the resource:
   lowScore[computational resource]=SQRT(SUM(SQR(targetUtilization−hostUtilization)));
   lowUtil[computational resource]=(any host system hostUtilization<(targetUtilization-tolerance))? true: false;
   considerHostPowerOff=(lowUtil[computational resource] for both resources)? true:false.
104. If considerHostPowerOn then
   Consider recommending host system power-on operations else if considerHostPowerOff then
   Consider recommending host system power-off operations.

The pseudo-code for powering-on host systems of server cluster 20 is as follows:
105. Perform steps 100-104, recited above.
106. For next standby host system H, create NOC with host system H powered-on.
107. For NOC, run step 100, with powering-on host systems disallowed.
108. For NOC, run steps 102 and 103.
109. If NOC highScore[computational resource] better than COC highScore[computational resource],
110. Recommend powering-on host system H, replace COC with NOC
111. Repeat steps 106-110 while considerHostPowerOn true for COC and more host systems to consider
112. Power-on any additional standby host systems needed to reach min-powered-on-capacity.

The pseudo-code for powering-off of host systems of server cluster 20 is as follows:

113. Performs steps 100-104.
114. For next powered-on host system H, create NOC with host system H evacuated (if possible) & powered-off.
115. Call DPM module 74 host system power-off cost/benefit to evaluate if power savings is worth performance risk.
116. For NOC, run step 100, with powering-on host systems disallowed.
117. For NOC, run steps 102 and 103.
118. If NOC lowScore[computational resource] better than COC lowScore[computational resource]; and
119. If NOC highScore[computational resource] is not worse than COC highScore[computational resource].
120. Recommend powering-off host system H along with any prerequisite Vmotions, replace COC with NOC.
121. Repeat steps 114-120 while considerHostPowerOff true for COC and more host systems to consider.

To determine the cost/benefit of powering-off a particular host system of server cluster 20 DPM module 74 compares the risk-adjusted costs of power-off with a conservative projection of the power-savings benefit, and rejects the host system power-off unless the benefit exceeds the cost by a configurable factor. The pseudo-code for determining the cost/benefit of powering-off a particular host system is as follows:

122. DPM module 74 host system power-off cost/benefit computes the risk-adjusted costs of power-off of host system H as the sum of:
123. Cost of migrating any running VMs off of the associated host system;
124. Loss of the host system's resources during powering-off period;
125. Power consumed during powering-off period;
126. Performance loss if resources become needed to meet demand while host system is off;
127. Loss of host system's resources during its subsequent powering-on period;
128. Power consumed during powering-on period; and
129. Cost of migrating VMs back onto the host system after it is powered-on.
130. This sum is compared with a conservative projection of power-savings benefit obtained by host system power-off.
131. Host system power-off is rejected unless benefit exceeds cost by configurable factor.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The embodiments of the present invention described above are exemplary. Many changes and modifications may be made to the disclosure recited above, while remaining within the scope of the invention. Therefore, the scope of the invention should not be limited by the above description, but instead should be determined with reference to the appended claims along with their full scope of equivalents. Additionally, embodiments of the present invention may be implemented in software, firmware or as an abstract of a physical computer system known in the art as a virtual machine or a combination of software, firmware and a virtual machine. With respect to implementing embodiments of the present invention as a virtual machine, expression of such embodiments may be either as virtual system hardware, guest system software of the virtual machine or a combination thereof. The scope of the invention should, therefore, be limited not to the above description, but instead should be determined with reference to the appended claims along with their full scope of equivalents.

What is claimed is:

1. A method of reducing power consumption of a server cluster of host systems with virtual machines executing on the host systems, the method comprising:
 recommending host system power-on when there is a host system whose utilization is above a target utilization, and recommending host system power-off when there is a host system whose utilization is below the target utilization, wherein recommending host system power-on includes calculating impact of powering on a standby host system with respect to reducing the number of highly-utilized host systems in the server cluster whose utilization is above the target utilization, with the impact of powering on calculated by simulating moving some virtual machines from highly utilized host systems to the standby host system being recommended to be powered on, wherein recommending host system power-off includes calculating impact of powering off a host system with respect to decreasing the number of less-utilized host systems in the server cluster whose utilization is below the target utilization, with the impact of powering off calculated by simulating moving all virtual machines from the host system, which is being recommended to be powered-off, to less-utilized host systems, wherein calculating impact of powering on or calculating impact of powering off includes computing for the server cluster a sum of the weighted distance above or below the target utilization for each host system, respectively, and wherein calculating impact of powering on or calculating impact of powering off further includes comparing the sum for the cluster without the host system powered-on with the sum calculated for the server cluster with the host system powered-on under a simulation or comparing the sum for the cluster with the host system powered-off under a simulation with the sum calculated for the server cluster with the host system kept powered-on, respectively.

2. The method as recited in claim 1, wherein calculating impact of powering on includes iterating as follows:

for each host system, determining utilization as ratio of demand to capacity for the host system, and if the utilization for any host system is over a target utilization, iterating through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host system powered on, recommending that the standby host system be powered on.

3. The method as recited in claim 1, wherein calculating impact of powering off includes iterating as follows:

for each host system, determining utilization, and if the utilization for any host system is under a target utilization, iterating through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that the host system kept powered on, recommending that the host system be powered off.

4. The method as recited in claim 1, wherein recommending host system power-off includes calculating host system power-off cost, wherein factors involved in calculating the host system power-off cost include one or more of a loss of the host system's resources during power-down, power consumed during a power-down period, a loss of performance if the host system's resources become needed to meet demand while the host system is powered off, a loss of the host system's resources during a subsequent power-on operation, power consumed during a power-up period, and costs of migrating virtual machines back onto the host system.

5. The method as recited in claim 4, further including performing a cost benefit analysis of powering-off the host system compared to the host system power-off cost.

6. A system for reducing power consumption of a server cluster of host systems with virtual machines executing on the host systems, the system comprising:

a cluster management server to manage the server cluster, the cluster management server including a distributed resource scheduling (DRS) module to manage allocation of resources to the virtual machines running on the server cluster; and a distributed power management (DPM) module coupled to the DRS module to recommend powering-on or powering-off a host system in the server cluster to save power, wherein the DPM module includes a power-on impact calculation module or a power-off impact calculation module configured to compute for the server cluster a sum of the weighted distance above or below a target utilization for each host system, respectively, and wherein the power-on impact calculation module or the power-off impact calculation module is further configured to compare the sum for the cluster without the host system powered-on with the sum calculated for the server cluster with the host system powered-on under a simulation or compare the sum for the cluster with the host system powered-off under a simulation with the sum calculated for the server cluster with the host system kept powered-on, respectively.

7. The system as recited in claim 6, further including a user interface to facilitate data communication to enable a user to control operations of the server cluster.

8. The system as recited in claim 6, wherein the DPM module includes a host system power-off cost and host system power-off benefit analysis module.

9. The system as recited in claim 6, wherein the DPM module includes the power-on impact calculation module.

10. The system as recited in claim 6, wherein the DPM module includes the power-off impact calculation module.

11. A non-transitory computer readable media having program instructions for reducing power consumption of a server cluster of host systems with virtual machines executing on the host systems, the non-transitory computer readable media comprising:

program instructions for recommending host system power-on when there is a host system whose utilization is above a target utilization, and recommending host system power-off when there is a host system whose utilization is below the target utilization, wherein program instructions for recommending host system power-on include program instructions for calculating impact of powering on a standby host system with respect to reducing the number of highly-utilized host systems in the server cluster whose utilization is above the target utilization, with the impact of powering on calculated by simulating moving some virtual machines from highly utilized host systems to the standby host system being recommended to be powered on, wherein program instructions for recommending host system power-off include program instructions for calculating impact of powering off a host system with respect to decreasing the number of less-utilized host systems in the server cluster whose utilization is below the target utilization, with the impact of powering off calculated by simulating moving all virtual machines from the host system, which is being recommended to be powered-off, to less-utilized host systems, wherein program instructions for calculating impact of powering on or program instructions for calculating impact of powering off include program instructions for computing for the server cluster a sum of the weighted distance above or below the target utilization for each host system, respectively, and wherein program instructions for calculating impact of powering on or program instructions for calculating impact of powering off further include program instructions for comparing the sum for the cluster without the host system powered-on with the sum calculated for the server cluster with the host system powered-on under a simulation or program instructions for comparing the sum for the cluster with the host system powered-off under a simulation with the sum calculated for the server cluster with the host system kept powered-on, respectively.

12. The non-transitory computer readable media as recited in claim 11, wherein program instructions for calculating impact of powering on include program instructions for performing the following iterations:

for each host system, determining utilization as ratio of demand to capacity for the host system, and if the utilization for any host system is over a target utilization, iterating through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host system powered on, recommending that the standby host system be powered on.

13. The non-transitory computer readable media as recited in claim 11, wherein program instructions for calculating impact of powering off include program instructions for performing the following iterations:

for each host system, determining utilization, and if the utilization for any host system is under a target utilization, iterating through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that the host system kept powered on, recommending that the host system be powered off.

14. A method of reducing power consumption of a server cluster of host systems with virtual machines executing on the host systems, the method comprising:

recommending host system power-on when there is a host system whose utilization is above a target utilization, and recommending host system power-off when there is a host system whose utilization is below the target utilization, wherein recommending host system power-on includes calculating impact of powering on a standby host system with respect to reducing the number of highly-utilized host systems in the server cluster whose utilization is above the target utilization, with the impact of powering on calculated by simulating moving some virtual machines from highly utilized host systems to the standby host system being recommended to be powered on, wherein recommending host system power-off includes calculating impact of powering off a host system with respect to decreasing the number of less-utilized host systems in the server cluster whose utilization is below the target utilization, with the impact of powering off calculated by simulating moving all virtual machines from the host system, which is being recommended to be powered-off, to less-utilized host systems, wherein calculating impact of powering on includes iterating as follows:

for each host system, determining utilization as ratio of demand to capacity for the host system, and if the utilization for any host system is over a target utilization, iterating through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host system powered on, recommending that the standby host system be powered on, or wherein calculating impact of powering off includes iterating as follows:

for each host system, determining utilization, and if the utilization for any host system is under a target utilization, iterating through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that the host system kept powered on, recommending that the host system be powered off.

15. A system for reducing power consumption of a server cluster of host systems with virtual machines executing on the host systems, the system comprising:

a cluster management server to manage the server cluster, the cluster management server including a distributed resource scheduling (DRS) module to manage allocation of resources to the virtual machines running on the server cluster; and a distributed power management (DPM) module coupled to the DRS module to recommend powering-on or powering-off a host system in the server cluster to save power, wherein the DPM module includes a power-on impact calculation module configured to iterate as follows:

for each host system, determine utilization as ratio of demand to capacity for the host system, and if the utilization for any host system is over a target utilization, iterate through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host system powered on, recommend that the standby host system be powered on, or wherein the DPM module includes a power-off impact calculation module configured to iterate as follows:

for each host system, determine utilization, and if the utilization for any host system is under a target utilization, iterate through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that the host system kept powered on, recommending that the host system be powered off, respectively.

16. A non-transitory computer readable media having program instructions for reducing power consumption of a server cluster of host systems with virtual machines executing on the host systems, the non-transitory computer readable media comprising:

program instructions for recommending host system power-on when there is a host system whose utilization is above a target utilization, and recommending host system power-off when there is a host system whose utilization is below the target utilization, wherein program instructions for recommending host system power-on include program instructions for calculating impact of powering on a standby host system with respect to reducing the number of highly-utilized host systems in the server cluster whose utilization is above the target utilization, with the impact of powering on calculated by simulating moving some virtual machines from highly utilized host systems to the standby host system being recommended to be powered on, wherein program instructions for recommending host system power-off include program instructions for calculating impact of powering off a host system with respect to decreasing the number of less-utilized host systems in the server cluster whose utilization is below the target utilization, with the impact of powering off calculated by simulating moving all virtual machines from the host system, which is being recommended to be powered-off, to less-utilized host systems, wherein program instructions for calculating impact of powering on include program instructions for performing the following iterations:

for each host system, determining utilization as ratio of demand to capacity for the host system, and if the utilization for any host system is over a target utilization, iterating through standby host systems by determining a "what if" plan assuming the standby host system was powered on, and quantifying an impact of powering on the standby host system by determining a sum of a weighted distance above the target utilization for each host system above the target utilization, assuming the standby powered off host system is powered on and with the standby host system powered off, and if the sum improves with the standby host system powered on, recommending that the standby host system be powered on, or wherein program instructions for calculating impact of powering off include program instructions for performing the following iterations:

for each host system, determining utilization, and if the utilization for any host system is under a target utilization, iterating through powered on host systems by determining a "what if" plan assuming the powered on host system was powered off, and quantifying an impact of powering off the host system by determining a sum of a weighted distance below the target utilization for each host system below the target utilization, assuming the powered on host system is powered on and with the powered on host system powered off, and if the sum improves with the powered on host system powered off and the sum of target utilizations above the target utilization is not worse than that the host system kept powered on, recommending that the host system be powered off.

* * * * *